(12) United States Patent
Kelly et al.

(10) Patent No.: US 6,737,661 B2
(45) Date of Patent: May 18, 2004

(54) PRE-TREATMENT OF MOLDS

(75) Inventors: William Michael Kelly, Lawrenceville, GA (US); Rudiger Reinhard Penno, Suwanee, GA (US); Michael Jean Dormeyer, Duluth, GA (US)

(73) Assignee: Novartis AG, Basel (CH)

( * ) Notice: Subject to any disclaimer, the term of this patent is extended or adjusted under 35 U.S.C. 154(b) by 153 days.

(21) Appl. No.: 09/911,330

(22) Filed: Jul. 23, 2001

(65) Prior Publication Data

US 2002/0020825 A1 Feb. 21, 2002

Related U.S. Application Data

(60) Provisional application No. 60/225,941, filed on Aug. 17, 2000.

(51) Int. Cl.⁷ .................. G01R 23/02; B29D 11/00
(52) U.S. Cl. ...................... 250/504 R; 264/1.1
(58) Field of Search .............. 250/504 R; 264/1.1, 264/446, 494

(56) References Cited

U.S. PATENT DOCUMENTS

| | | | |
|---|---|---|---|
| 5,160,361 A | 11/1992 | Murata et al. | 65/102 |
| 5,508,317 A | 4/1996 | Muller | 522/85 |
| 5,782,460 A | 7/1998 | Kretzschmar et al. | 264/1.36 |
| 5,901,948 A * | 5/1999 | Yamamoto et al. | 269/289 R |
| 6,061,174 A * | 5/2000 | Shiozawa et al. | 359/361 |
| 6,071,440 A * | 6/2000 | Wang et al. | 264/1.1 |
| 6,368,522 B1 * | 4/2002 | Ansell et al. | 264/1.1 |
| 6,448,563 B1 * | 9/2002 | Hauck et al. | 250/373 |
| 6,491,281 B1 * | 12/2002 | Gotou et al. | 249/114.1 |
| 6,497,795 B1 * | 12/2002 | Kato | 204/157.3 |
| 2002/0119072 A1 * | 8/2002 | Bushnell et al. | 422/22 |

FOREIGN PATENT DOCUMENTS

| | | |
|---|---|---|
| EP | 0 637 490 | 7/1994 |
| FR | 2759310 | 8/1998 |
| JP | 61021925 | 1/1986 |
| JP | 05031736 | 2/1993 |

* cited by examiner

Primary Examiner—Stephen D. Meier
Assistant Examiner—Alfred E. Dudding
(74) Attorney, Agent, or Firm—Jian Zhou; Robert J. Gorman; R. Scott Meece

(57) ABSTRACT

An irradiation device for treating molds comprising a UV irradiation source, and a means for holding the molds. The invention is also a method of treating molds, comprising the steps of exposing a mold to a high intensity UV radiation for a predetermined time.

20 Claims, 6 Drawing Sheets

PRE-TREATMENT OF MOLDS

This application claims the benefit under 35 U.S.C. § 119(e) of U.S. provisional application No. 60/225,941 filed Aug. 17, 2000.

FIELD OF THE INVENTION

The invention relates to a method and a device for the treatment of molds to produce an ophthalmic molding, especially an ophthalmic lens, particularly a contact lens.

BACKGROUND OF THE INVENTION

Contact lenses can be manufactured economically in large numbers by the so-called mold or full/mold process. In this process, the lenses are manufactured into their final shape between two mold halves, with no need to subsequently finish the surfaces of the lenses, or finish the edges. Mold processes are described for example in PCT patent application No. WO/87/04390 or in EP-A 0 367 513.

The contact lenses produced in this manner are molded parts having little mechanical stability and a water content of more than 60% in weight. After manufacture, the lens is inspected, then packed and subjected to heat sterilization in an autoclave.

The geometry of the contact lenses is defined by the mold cavity. The edge of the contact lens is formed by the mold, which normally consists of two mold halves. The geometry of the edge is defined by the contour of the two mold halves in the area where they make contact.

To manufacture a contact lens, a predetermined amount of a flowable starting material is placed in the female mold half. Afterwards, the mold is closed by placing the male mold half thereon. Normally, a surplus of starting material is used, so that, when the mold is closed, the excess amount is expelled out into an overflow area adjacent to the mold cavity. The subsequent polymerization or crosslinking of the starting material takes place by radiation with UV light, or by heat action, or by another non-thermal method.

In U.S. Pat. No. 5,508,317, a new contact lens material is described, which represents an important improvement in the chemistry of polymerizable starting material for the manufacture of contact lenses. The patent discloses a water-soluble composition of a prepolymer, which is filled into the mold cavity and then crosslinked photochemically. Since the prepolymer has several crosslinkable groups, the crosslinking is notable for its high quality, so that a finished lens of optical quality can be produced within a few seconds, without the necessity for subsequent extraction or finishing steps. Owing to the improved chemistry of the starting material as illustrated in the patent, contact lenses can be produced at considerably lower cost, so that in this way it is possible to produce disposable lenses that are used only once.

EP-A-0 637 490 describes a process by means of which a further improvement may be obtained in the preparation process of contact lenses with the prepolymer described in U.S. Pat. No. 5,508,317. Here, the material is filled into a mold comprising two halves, whereby the two mold halves do not touch, but a thin circular gap is located between them. The gap is linked to the mold cavity, so that surplus lens material can flow away into the gap. Instead of the polypropylene molds that may be used only once, reusable quartz/glass molds may be used. Because of the water-soluble basic chemistry, after a lens has been produced, the uncrosslinked prepolymer and other residues can be removed from the molds rapidly and effectively with water, and the molds dried in the air. In this way, high precision of the lens shaping may also be achieved. Crosslinking of the prepolymer takes place by radiation especially with UV light, whereby radiation is restricted to the mold cavity by a chromium screen. In this way, only the material in the mold cavity is crosslinked, so that there is high reproducibility of the edges of the lens without closing the two polypropylene mold halves. The uncrosslinked shaded-off prepolymer solution can be easily washed away from the shaped, crosslinked lens with water.

However, the glass or quartz molds used to make the lenses do not immediately produce lenses without defects. Brand new glass, quartz or fused synthetic quartz molds inhibit crosslinking of the lens polymer. The lens edge is frequently insufficiently polymerized, making the borders of the lens ill defined. A large number of lenses must be made from the new molds before the lenses are of sufficient quality to be sold commercially. The lenses of inferior quality must be discarded. The problems with new molds eventually disappear, however, after a sufficient number of lenses have been made therefrom. This process is referred to as "burning in " new molds, and is expensive and time consuming. It is an object of the present invention to pre treat the molds to avoid the burn in procedure.

Therefore, it is necessary to produce a lot of moldings before starting with the production of moldings with the requested quality. However, this is very expensive and time-consuming.

The invention is concerned with the problem of improving the readiness for use of glass, quartz or fused synthetic quartz molds in order to start earlier with the production of moldings having a constant quality.

SUMMARY OF THE INVENTION

By coupling UV light into the mold cavity and by irradiating the molds the chemical structure of the glass/quartz surface is changed so that adhesion and deformation of the lens material to the surface can be reduced. This has the effect that high quality contact lenses can be produced considerably earlier, enabling a rapid use of the molds.

BRIEF DESCRIPTION OF THE DRAWINGS

Further details and advantages of the invention may be seen from the description that follows and the drawing. In the drawing.

DESCRIPTION OF THE PREFERRED EMBODIMENTS

Figure 1:
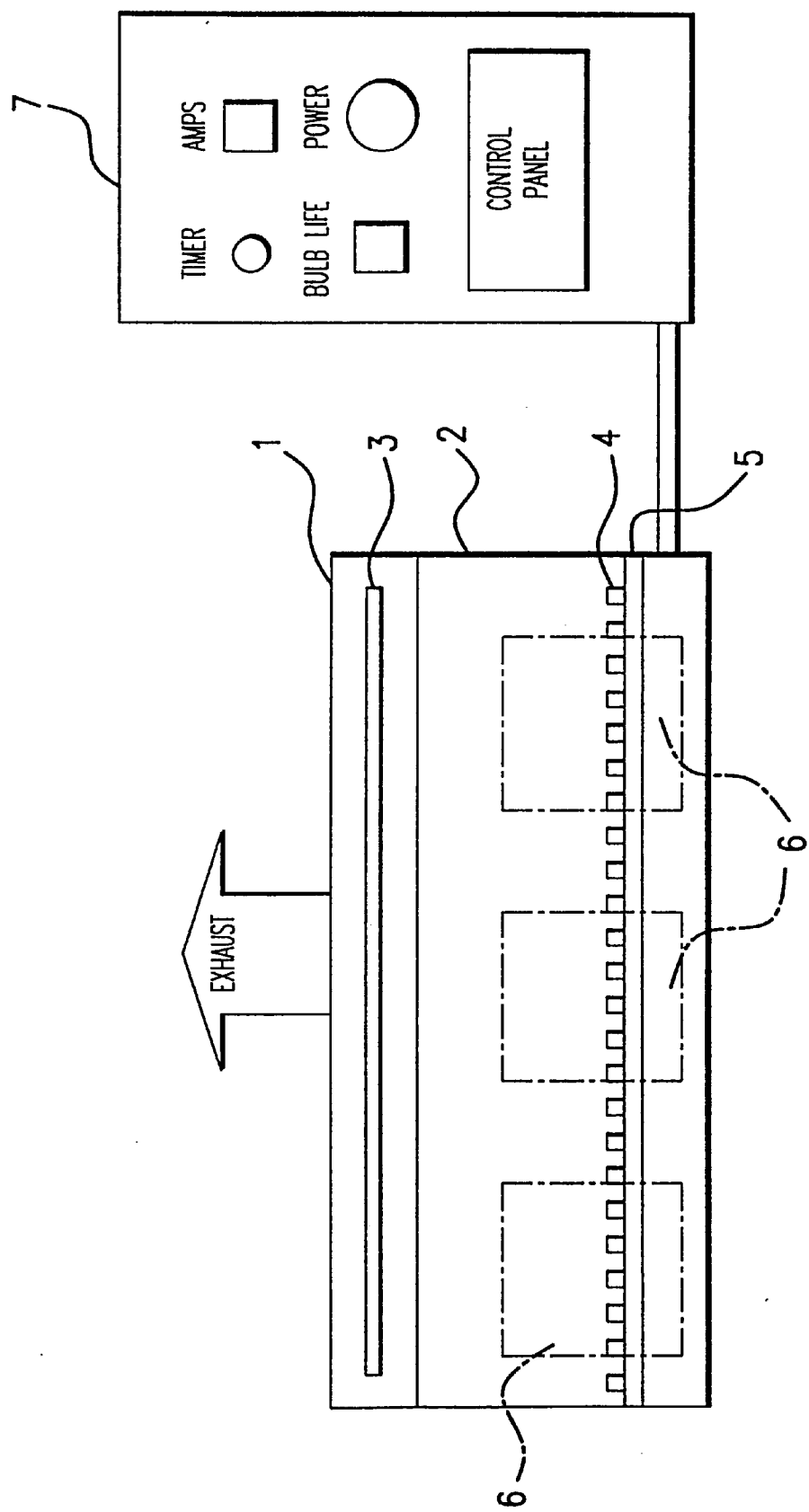
FIG. 1 shows a schematic illustration of an embodiment of a UV irradiation device according to the invention.

The UV irradiation device 1 illustrated schematically in FIG. 1 is preferably mounted in a housing 2 and consists of a UV lamp 3 installed in the upper area of the housing 2. The UV lamp 3 in question is preferably a mercury vapor lamp. The UV lamp 3 can be suitably mounted on a quick-change cradle to enable the lamp 3 to be exchanged easily. The emission spectrum of the UV lamp 2 advantageously has a high UV intensity in the wavelength range 280–305 nm. The intensity of the UV radiation in this range is greater than 1 mW/cm$^2$, and preferably at least 2.45 mW/cm$^2$. The molds 4 are arranged advantageously on a tray 5 that is located in the lower area of the housing 2, so that the molds 4 can be irradiated quite homogeneously. For providing a cooling and exhaust system the side walls of the housing 2 are equipped preferably with vents 6. The device 1 is controlled in respect of the power of the mercury lamp 3 and the irradiation time by a control panel 7. The molds 3 are arranged on the tray 5 that is inserted subsequently into the housing 2. Then the irradiation of the molds starts. Typically the duration of the irradiation lasts for over 90 hours.

Figure 2:
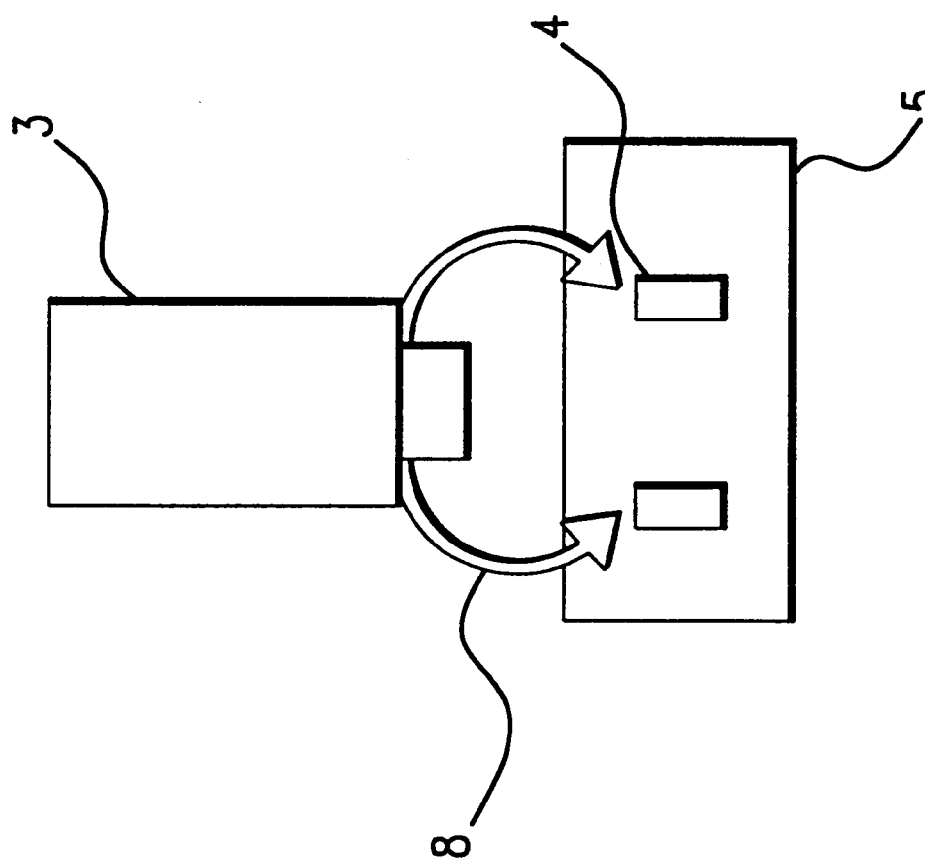
FIG. 2 shows a schematic illustration of a second embodiment of a UV irradiation device according to the invention.

In FIG. 2 another embodiment of an irradiation device is disclosed. The device consists as well of a UV lamp 3 and a tray 5 or a similar holding device for the molds 4. The UV-lamp 3 and the tray 5 can be mounted in a housing not illustrated in full here. The UV-lamp 3 is preferably a UV laser like an excimer laser. The laser light is transmitted by several optical fibers 8 to the molds 4. The optical fibers 8 conveniently have a length of 0.3 to 2 m and are advantageously formed as liquid photoconductors, since these are particularly well suited to the transmission of UV light. Liquid photoconductors are notable for their high UV transmission, their more homogeneous distribution of intensity of the emerging light rays compared with quartz fiber bundles, and their higher usable cross-sectional area given the same diameter. The emission spectrum of the UV laser 3 advantageously has a high UV intensity in the wavelength range 280–305 nm. Due to the use of optical fibers 8 a high proportion of the radiation emitting from the UV laser 3 can be coupled into the molds 4. Normally one mold is irradiated with one optical fiber. For achieving a high UV intensity at the mold, the distance between the end of the fiber optic and the surface of the mold should be as short as possible.

In order to examine the results of the UV irradiation treatment of the molds, measurements with an ESCA instrument (surface scanning electron microscope) were performed in order to investigate changes of the chemical composition of the surface as a function of the UV irradiation time.

A single male and a single female mold were irradiated with UV light, using time periods of 0, 12, 24 and 48 hours of exposure. Then the molds were transferred to an ESCA instrument for detecting the chemical surface composition. ESCA is an acronym for Electron Spectroscopy for Chemical Analysis. A more descriptive, and common, name is XPS: X-ray Photoelectron Spectroscopy.

The ESCA spectrometer is a model SSX-100 manufactured by Surface Science, Inc. of Mountainview, Calif.

Figure 3:
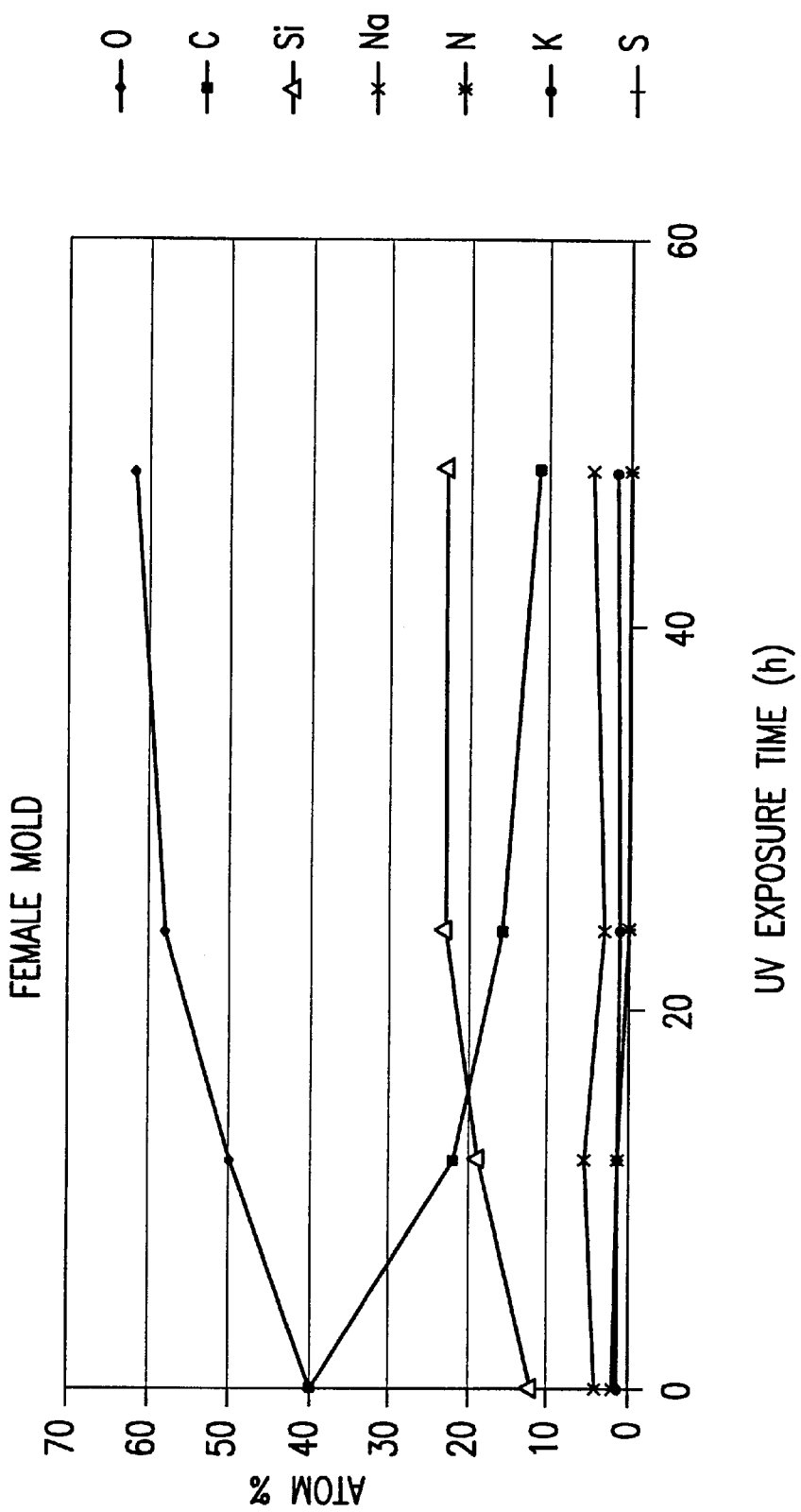
FIG. 3 ESCA measurements as a function of time of the UV irradiation of a single female mold.
Figure 4:
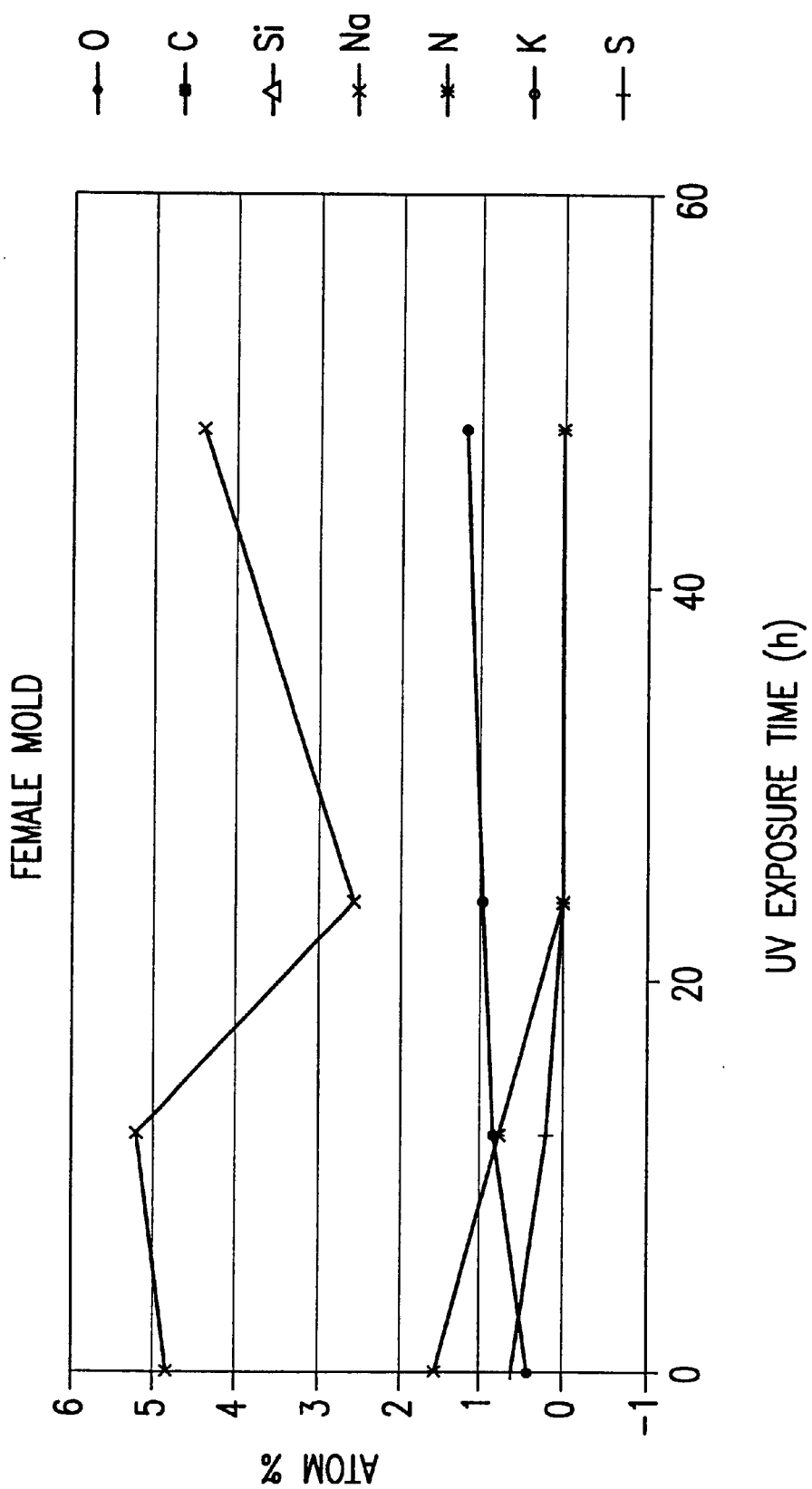
FIG. 4 ESCA measurements as a function of time of the UV irradiation of a single female mold.

In FIGS. 3 and 4 ESCA spectra from a single female mold are shown. FIG. 3 shows a gradual increase in oxygen and silicon signals as a function of time and a gradual decrease in carbon. In FIG. 4 there is an elimination of signals from nitrogen and sulfur after 24 hours of irradiation. These signals show intermediate signal strengths at 12 hours of exposure, and remain at an undetectable level after 24 hours and 48 hours of exposure. This is interpreted as a real effect associated by the UV irradiation. There is also in FIG. 4 a signal from sodium (Na) observed on the female mold. Since this signal appears to show no trend as a function of UV irradiation time, it is not perceived to be associated with the beneficial effect of the UV light.

Figure 5:
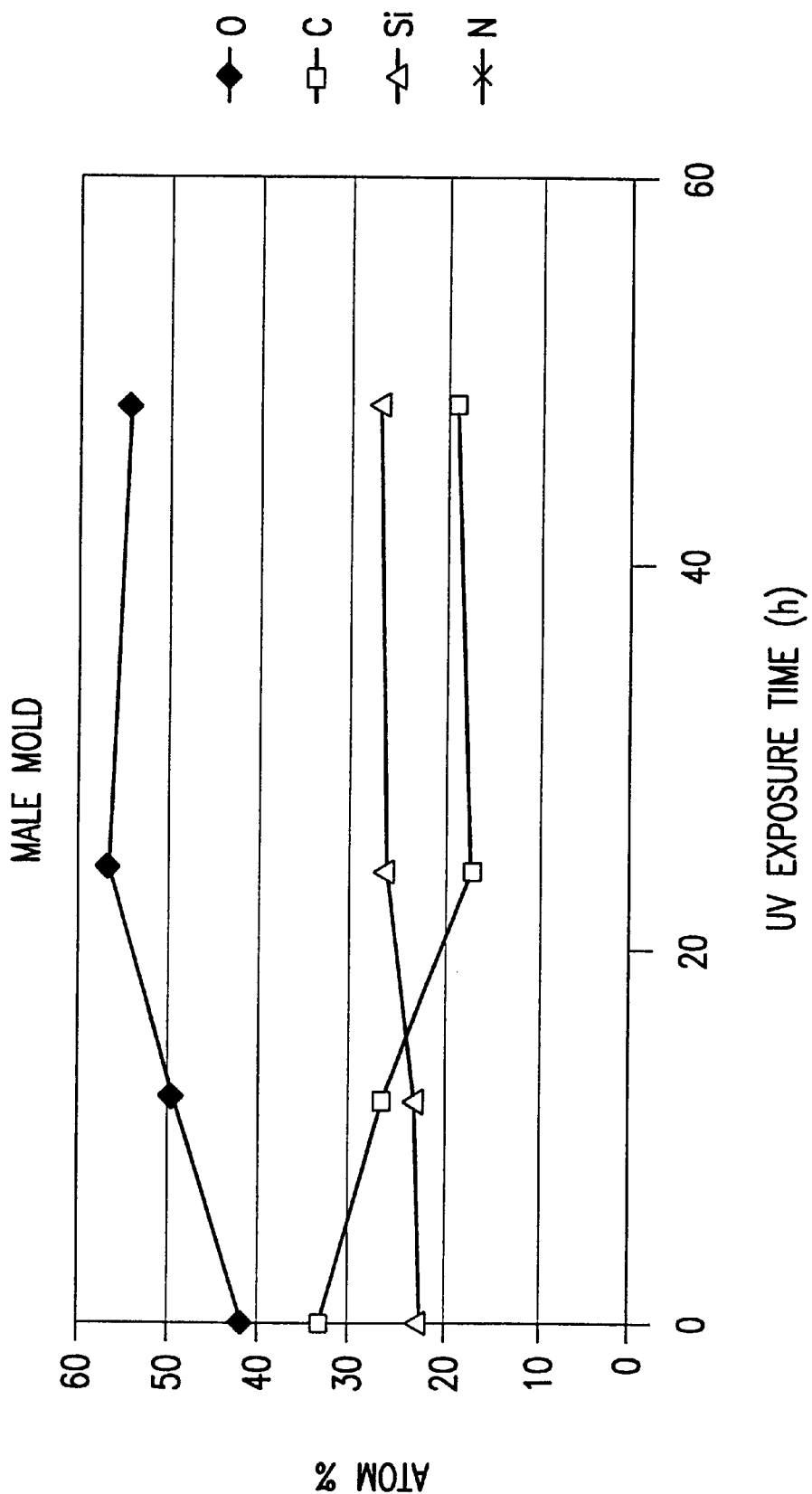
FIG. 5 ESCA measurements as a function of time of the UV irradiation of a single male mold.
Figure 6:
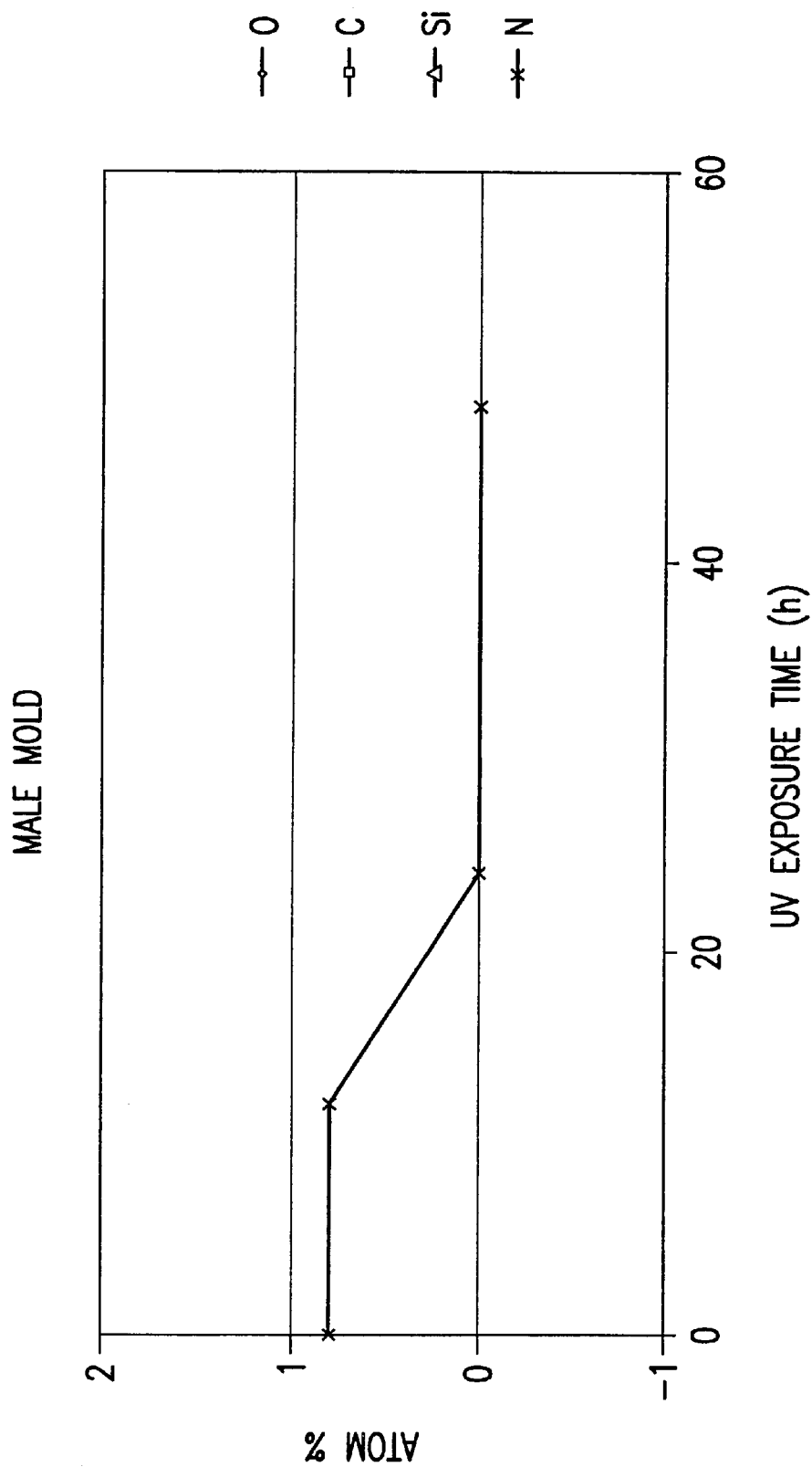
FIG. 6 ESCA measurements as a function of time of the UV irradiation of a single male mold.

In FIGS. 5 and 6 ESCA spectra from a single male mold are shown. There is a gradual increase in oxygen and silicon signal as a function of time that is accompanied by a decrease in the carbon signal. This was also observed for the female mold. Further, a decrease in nitrogen signal is observed to occur between 12 hours and 24 hours of irradiation.

Thus, further female and male molds show a decrease in carbon signal and a decrease in nitrogen signal as a function of irradiation time, and these decreases result in increases of the Si and O signals. Further, for the female mold, there is additionally a decrease in sulfur as a function of time.

In this way, by irradiating the mold cavity by UV, the invention enables to improve the readiness of use of the molds for the production of high quality contact lenses. The chemical structure of the surface of the mold cavity is changed by the UV irradiation so that deformation of the lens material due to surface effects can be avoided.

We claim:

1. An irradiation device for treating molds comprising:
    a means for holding the molds, and
    a UV irradiation source which provides a UV irradiation with which the molds are treated, wherein the UV irradiation has an intensity of greater than 1 mW/cm$^2$ in a wavelength range of 280–305 nm.

2. The irradiation device according to claim 1, whereby said UV irradiation source is a mercury lamp.

3. The irradiation device according to claim 2, whereby the emission spectrum of said mercury lamp has a UV intensity of at least 2.45 mW/cm$^2$ in the wavelength range of 280–305 nm.

4. The irradiation device according to claim 2, whereby the intensity of said mercury lamp is at 1.8 to 3.0 mW/cm$^2$.

5. The irradiation device according to claim 1, whereby said UV irradiation source is an excimer laser.

6. The irradiation device according to claim 5, whereby the UV light of said excimer laser is transmitted to the molds by optical fibers.

7. The irradiation device according to claim 5, whereby the emission spectrum of said excimer laser has a UV intensity of at least 2.45 mW/cm$^2$ in the wavelength range of 280–305 nm.

8. The irradiation device according to claims 5, whereby the intensity of said excimer laser is at 1.8 to 3.0 mW/cm$^2$.

9. The irradiation device according to claim 1, wherein the molds are glass, quartz, or fused synthetic quartz.

10. A method of treating molds, comprising the steps of:
    exposing a mold to a UV radiation having an intensity of greater than 1 mW/cm$^2$ in a wavelength range of 280–305 nm for a predetermined time sufficient to change the chemical structure of the surface of the mold cavity of the mold so that deformation of the lens material due to surface effects can be minimized.

11. The method according to claim 10, whereby a mercury lamp is used as a source for the UV radiation.

12. The method according to claim 11, whereby the emission spectrum of said mercury lamp has a UV intensity of at least 2.45 mW/cm$^2$ in the wavelength range of 280–305 nm.

13. The method according to claim 11, whereby the intensity of said mercury lamp is at 1.8 to 3.0 mW/cm$^2$.

14. The method according to claim 10, whereby an excimer laser is used as a source for the UV radiation.

15. The method according to claim 14, whereby the UV light of said excimer laser is transmitted to the molds by optical fibers.

16. The method according to claim 14, whereby the intensity of said excimer laser is at 1.8 to 3.0 mW/cm$^2$.

17. The method according to claim 14, whereby the emission spectrum of said excimer laser has a UV intensity of at least 2.45 mW/cm$^2$ in the wavelength range of 280–305 nm.

18. The method according to claim 10, whereby the mold is glass, quartz, or fused synthetic quartz.

19. The method according to claim 10, wherein the mold is exposed for a predetermined time of at least 24 hours.

20. The method according to claim 10, wherein the mold is exposed for a predetermined time of at least 48 hours.

* * * * *